United States Patent
Li et al.

(10) Patent No.: US 8,032,896 B1
(45) Date of Patent: Oct. 4, 2011

(54) SYSTEM AND METHOD FOR HISTOGRAM BASED CHATTER SUPPRESSION

(75) Inventors: Dongfeng Li, Cranberry Townhsip, PA (US); Larry Lancaster, Alameda, CA (US)

(73) Assignee: NetApp, Inc., Sunnyvale, CA (US)

( * ) Notice: Subject to any disclaimer, the term of this patent is extended or adjusted under 35 U.S.C. 154(b) by 1347 days.

(21) Appl. No.: 11/264,472

(22) Filed: Nov. 1, 2005

(51) Int. Cl.
*G06F 17/10* (2006.01)

(52) U.S. Cl. ........... 719/318; 714/39; 709/223; 709/224

(58) Field of Classification Search ................ 719/318
See application file for complete search history.

(56) References Cited

U.S. PATENT DOCUMENTS

| | | | | |
|---|---|---|---|---|
| 5,944,782 | A * | 8/1999 | Noble et al. | 709/202 |
| 7,392,311 | B2 * | 6/2008 | Grabarnik et al. | 709/224 |
| 2002/0116593 | A1 | 8/2002 | Kazar et al. | |
| 2004/0139167 | A1 | 7/2004 | Edsall et al. | |
| 2005/0192932 | A1 | 9/2005 | Kazar et al. | |
| 2005/0278383 | A1 | 12/2005 | Kazar et al. | |
| 2006/0036720 | A1 * | 2/2006 | Faulk, Jr. | 709/223 |

OTHER PUBLICATIONS

"Using the ISIS resource manager for distributed, fault-tolerant computing." Clark T. A. et al. Proceeding of the Twenty-Sixth Hawaii International Conference on System Sciences (Cat. No. 93TH0501-7) IEEE Los Alamitos, CA, USA, 1993, pp. 257-265 vol. 1, XP010640439, ISBN: 0-8186-3230-5.

* cited by examiner

*Primary Examiner* — H. S. Sough
*Assistant Examiner* — Syed Roni
(74) *Attorney, Agent, or Firm* — Cesari and McKenna, LLP

(57) ABSTRACT

A system and method suppresses chattering events in a storage system by determining a suppression level based upon a rate of growth of log files. An event management system of the storage system calculates a histogram and a set of statistics including a mean and standard deviation associated with non-chattering events. A cutoff point is determined for the non-chattering events and is utilized for each received event to determine if the received event is a chattering event. Events determined to be a chattering event are suppressed according to a predefined suppression rate.

17 Claims, 8 Drawing Sheets

SYSTEM AND METHOD FOR HISTOGRAM BASED CHATTER SUPPRESSION

FIELD OF THE INVENTION

The present invention relates to event management systems and, more particularly, to histogram based chatter suppression in event management systems.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

Many storage systems include an event monitoring system (EMS) that conveys appropriate system information and event notifications to system administrator and/or other interested parties, such as a vendor's customer support staff. As events occur within a storage system, the EMS logs the events in one or more event log files, which may then be utilized by the system administrator and/or customer support engineer to identify the cause of problems or to optimize system performance. A noted problem of such logging systems is that, the occurrence of events in the storage system typically generates a large volume of event messages that may be logged, some of which may be unimportant to the administrator using the system. As the number of unimportant messages that are logged increases, the size of the log files increases, which forces the administrator to sort through potentially thousands or tens of thousands of superfluous messages to find relevant log entries. Additionally, the storage space available for log files in the storage system may be limited. As such, as the number of messages being logged increases, the probability that the size of the log files exceed the space available increases. Furthermore, the log files may often be transmitted to a vendor for analysis after error conditions develop. Accordingly, as the size of the log files increase, there is a concomitant increase in transmission times and storage space requirements.

Certain event notification messages occur so frequently that they are deemed to be "chatter" and repeated logging of their occurrences wastes log space and complicates the administrator's ability to find relevant log information. Conventional UNIX-based event notification systems use a syslog program as an EMS perform limited suppression of such chatter messages. In such a conventional EMS, an event message is only suppressed if the same message occurs twice in a row; that is, if a chatter message is received twice in a row, only one instance is logged. However, if any message is received between the two chatter messages, then both chatter messages are logged. It is thus possible to have a situation where a plurality of chatter messages is intermingled with other messages such that no suppression occurs. Therefore, it is desirous to identify and suppress chatter messages to thereby limit the rate of growth of an event log file in a storage system.

SUMMARY OF THE INVENTION

The present invention overcomes the disadvantages of the prior art by providing a system and method for suppressing chattering messages in a storage system using histogram analysis. An event management system (EMS) first calculates a suppression level based upon a rate at which log files within the storage system are growing. The EMS then determines a possible percentage of non-chattering events based on the suppression level, and therefore generates a histogram of non-chattering events to the median and standard deviation. Additionally, the EMS calculates a cutoff point for non-chattering events utilizing the generated histogram and mean/standard deviation. Events occurring less frequently than the cutoff point are deemed to be non-chattering events; those that occur more frequently are deemed to be chatter.

When an event notification is received for a possible chattering event, a determination is made as to whether the event is truly a chattering event by comparing its frequency of occurrence with the cutoff point. If the event is a chattering event, then the EMS suppresses the event notification in accordance with a suppression rate. Illustratively, the suppression rate limits logging of chattering events to not more than one log entry per N minutes, where N is determined by the rate of growth of the log files. If the event is not a chattering event, then the EMS does not suppress the event and the appropriate event notification is sent.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
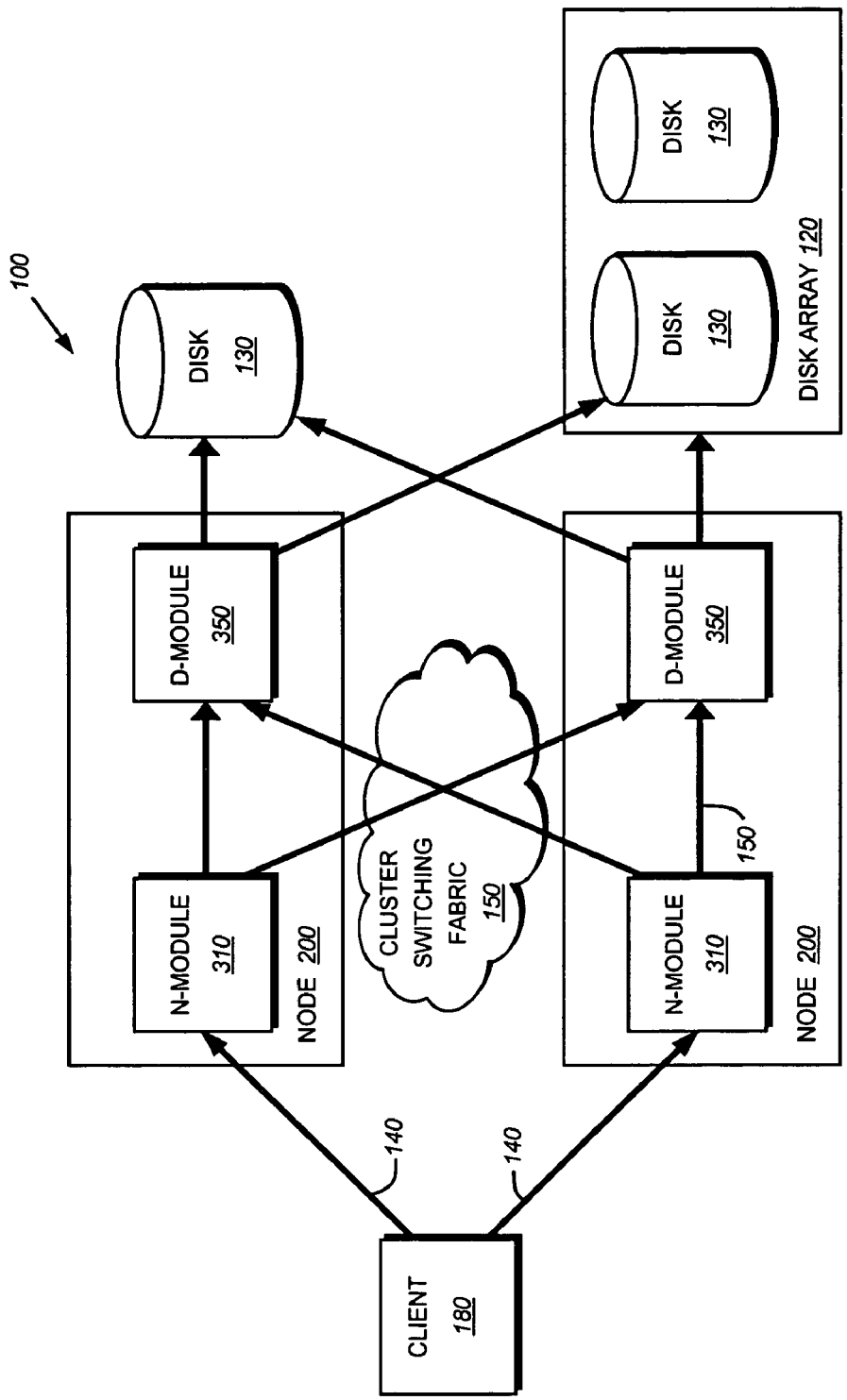
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
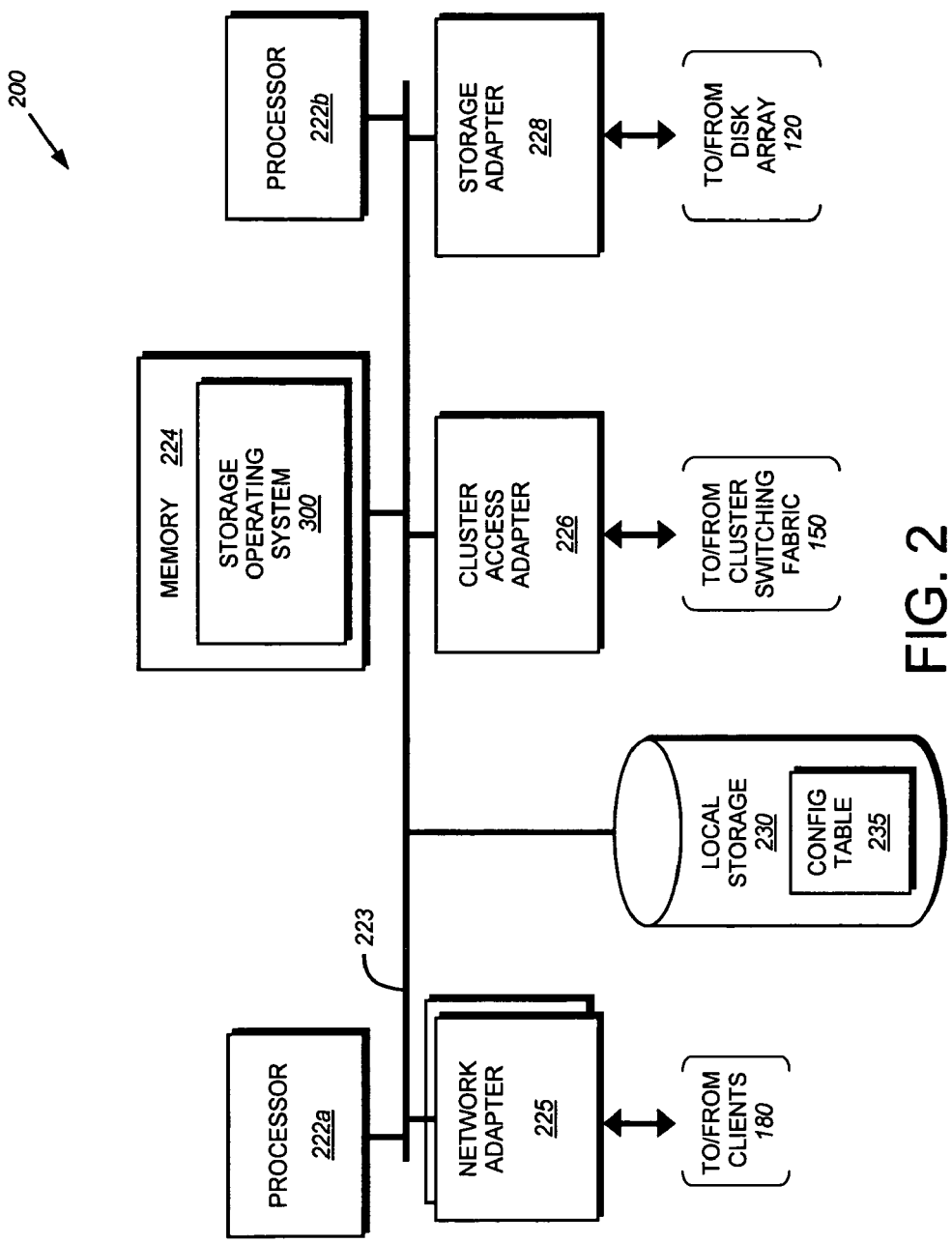
FIG. 2 is a schematic block diagram of a node in accordance with an embodiment of the present invention.

FIG. 2 is a schematic block diagram of a node 200 that is illustratively embodied as a storage system comprising a plurality of processors $222a,b$, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications 600 (see FIG. 6). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor $222a$ executes the functions of the N-module 310 on the node, while the other processor $222b$ executes the functions of the D-module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes is the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 is level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
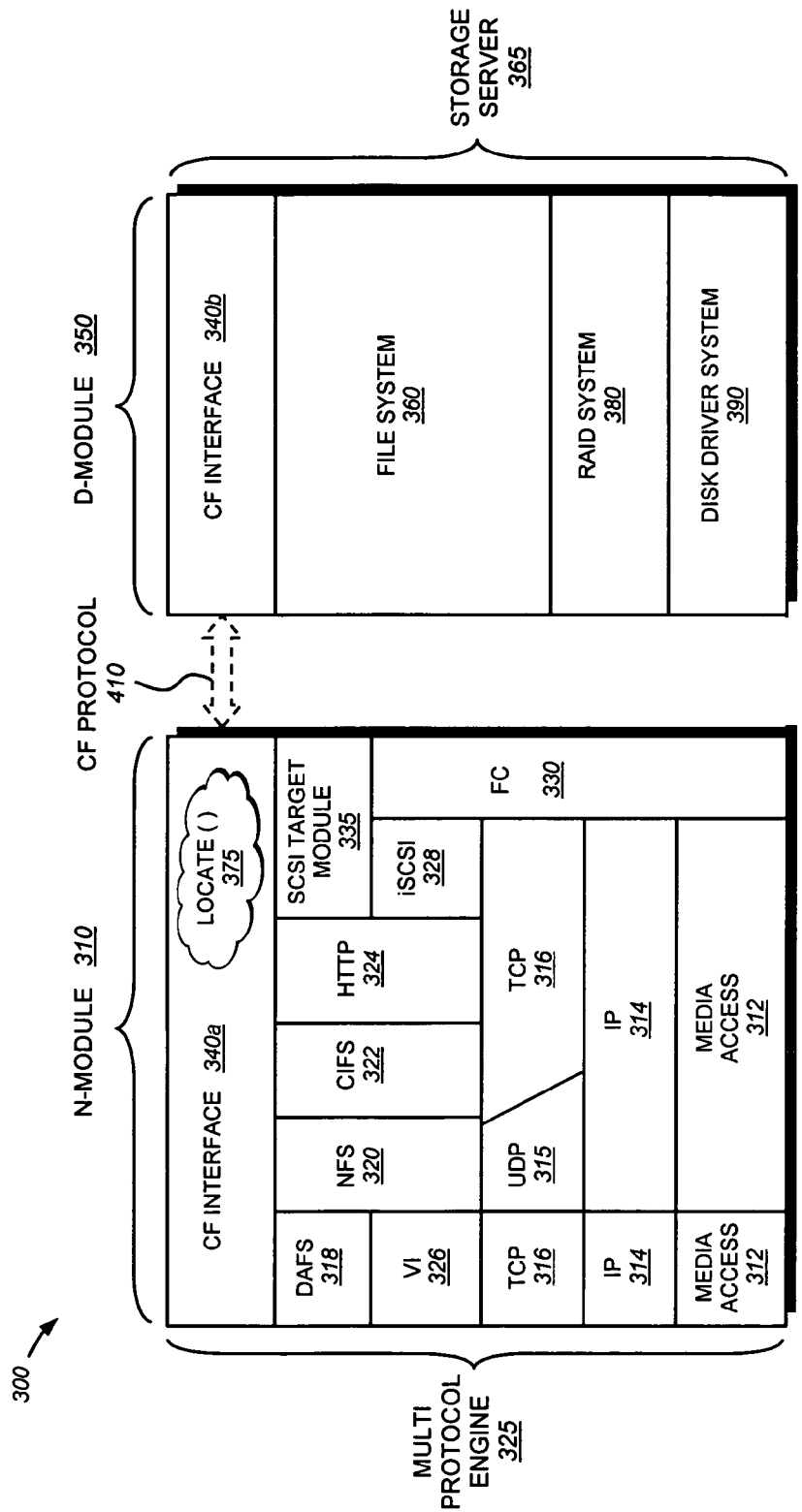
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperation with a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 610 (see FIG. 6), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into is the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340*a,b* adapted to implement intra-cluster communication among the modules, including D-module-to-D-module communication for data container striping operations described herein.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Patent Application Publication No. US 2002/0116593.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

Figure 4:
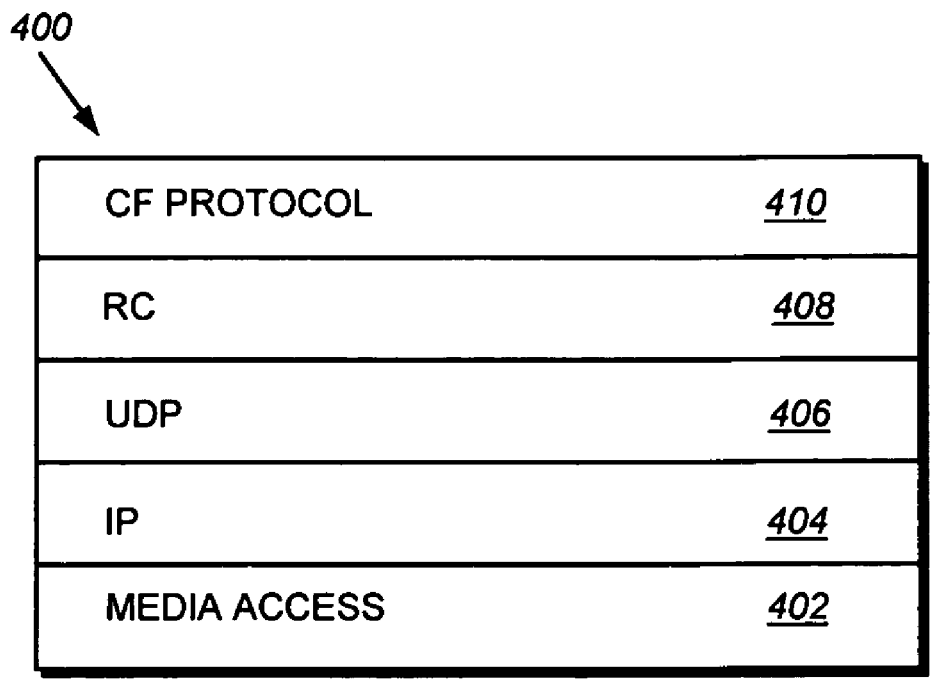
FIG. 4 is a schematic block diagram illustrating the format of a cluster fabric (CF) message in accordance with an embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

Figure 5:
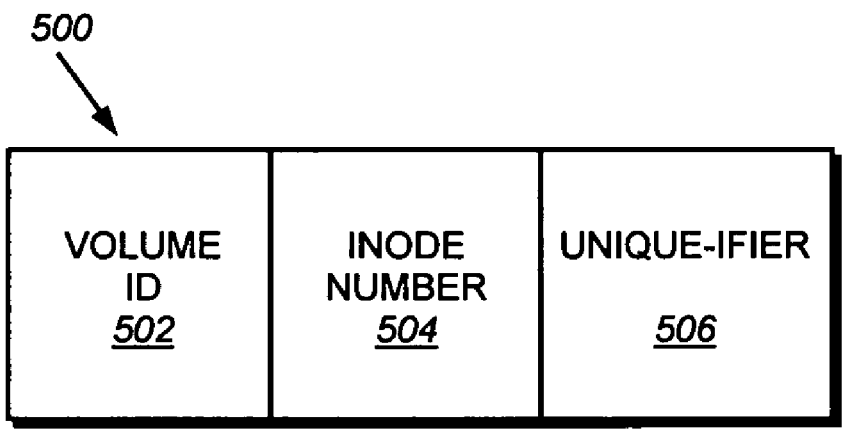
FIG. 5 is a schematic block diagram illustrating the format of a data container handle in accordance with an embodiment of the present invention.

A data container, e.g., a file, is accessed in the file system using a data container handle. FIG. 5 is a schematic block diagram illustrating the format of a data container handle 500 including a volume ID field 502, an inode number field 504 and, a uniquei-fier field 506. The volume ID field 502 contains a global identifier (within the cluster 100) of the volume within which the data container resides. The inode number field 504 contains an inode number of an inode (within an inode file) pertaining to the data container. The unique-ifier field 506 contains a monotonically increasing number that uniquely identifies the data container handle 500. The uniqueifier is particularly useful in the case where an inode number has been deleted, reused and reassigned to a new data container. The unique-ifier distinguishes that reused inode number in a particular data container from a potentially previous use of those fields.

F. Management Processes

Figure 6:
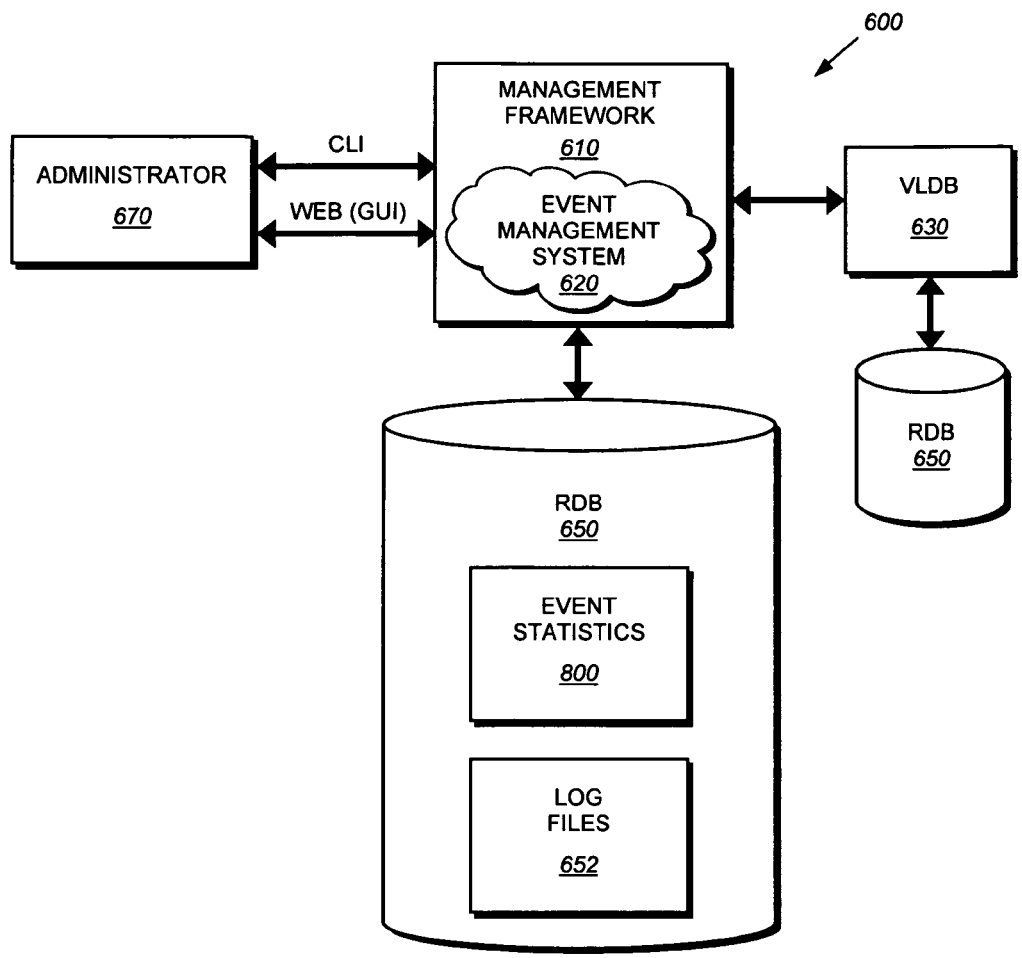
FIG. 6 is a schematic block diagram illustrating a collection of management processes in accordance with an embodiment of the present invention.

FIG. 6 is a schematic block diagram illustrating a collection of management processes that execute as user mode applications 600 on the storage operating system 300 to provide management of configuration information (i.e. management data) for the nodes of the cluster. To that end, the management processes include a management framework process 610 that includes an event management system (EMS) 620 and a volume location database (VLDB) process 630, each utilizing a data replication service (RDB 650) linked as a library. The management framework 610 provides a user interface to an administrator 670 via a command line interface (CLI) and/or a web-based graphical user interface (GUI). The management framework is illustratively based on a conventional common interface model (CIM) object manager that provides the entity to which users/system administrators interact with a node 200 in order to manage the cluster 100. The EMS 620 is configured to convey event notifications to the administrator via the CLI and/or GUI and is further configured to implement event logging and chatter suppression of the present invention, as described further below. To that end, the EMS 620 utilizes an event statistics data structure 800, described further below, which is stored in the RDB 650 for making chatter determinations. It should be noted that in alternate embodiments, the EMS may be located in other modules of the storage system or may reside in another computer within a storage system environment. As such, the description of the EMS being located as a user mode application on the storage operating system should be taken as exemplary only.

The VLDB 630 is a database process that tracks the locations of various storage components (e.g., flexible volumes, aggregates, etc.) within the cluster 100 to thereby facilitate routing of requests throughout the cluster. In the illustrative embodiment, the N-module 310 of each node accesses configuration table 235 that maps the volume ID 502 of a data container handle 500 to a D-module 350 that "owns" (services) the data container within the cluster. The VLDB includes a plurality of entries which, in turn, provide the contents of entries in the configuration table 235; among other things, these VLDB entries keep track of the locations of the volumes within the cluster. An example of such a VLDB entry is a VLDB volume entry 700.

Figure 7:
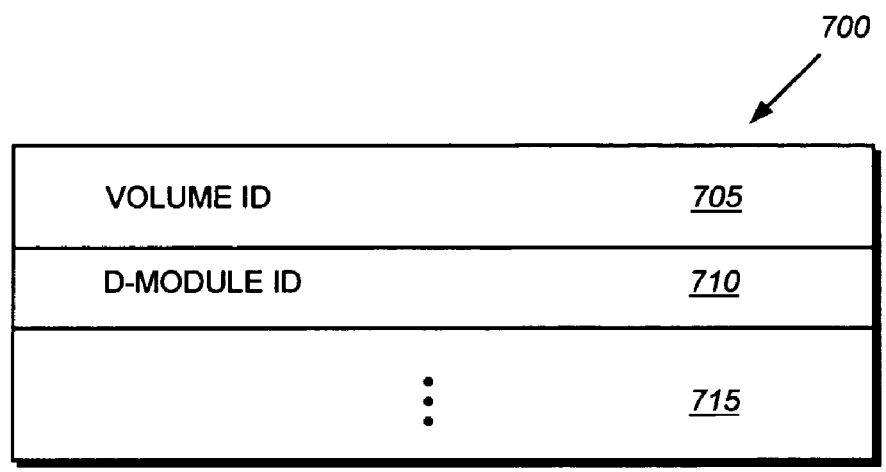
FIG. 7 is a schematic block diagram of a VLDB volume entry in accordance with an embodiment of the present invention.

FIG. 7 is a schematic block diagram of an exemplary VLDB volume entry 700 that includes a volume ID field 705, a D-module ID field 710 and, in alternate embodiments, additional fields 715. The volume ID field 705 contains an ID that identifies a volume is used in a volume location process. The D-module ID field 710 identifies the D-module hosting the volume identified by the volume ID field 705.

The VLDB illustratively implements a RPC interface, e.g., a Sun RPC interface, which allows the N-module 310 to query the VLDB 630. When encountering contents of a data container handle 500 that are not stored in its configuration table, the N-module sends an RPC to the VLDB process. In response, the VLDB 630 returns to the N-module the appropriate mapping information, including an ID of the D-module that owns the data container. The N-module caches the information in its configuration table 235 and uses the D-module ID to forward the incoming request to the appropriate data container. All functions and interactions between the N-module 310 and D-module 350 are coordinated on a cluster-wide basis through the collection of management processes and the RDB library user mode applications 600.

To that end, the management processes have interfaces to (are closely coupled to) RDB 650. The RDB comprises a library that provides a persistent object store (storing of objects) for the management data processed by the management processes. Notably, the RDB 650 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database.

Figure 8:
FIG. 8 is a schematic block diagram of an exemplary event statistics data structure in accordance with an embodiment of the present invention.

FIG. 8 is a schematic block diagram of an exemplary event statistics data structure 800 in accordance with an embodiment of the present invention. The event statistics data structure 800 includes an event type field 805, an event severity field 810, a starting time field 815, a last processed field 820, a last occurred field 825, a last suppressed field 830, a number suppressed field 835, a number occurred field 840, an array of recent occurrenes field 845, an array of last day occurrences field 850, an array of last week occurrences field 855, a chatter field 860 and, in alternate embodiments, additional fields 865.

The event type field 805 identifies the particular event for which this event statistics data structure is associated. The event severity field 810 identifies a severity level, for example, routine, emergency, critical that the administrator has associated with the event. It should be noted that these three severity levels are exemplary only and that in alternate embodiments, additional and/or differing severity levels may be utilized in accordance with the teachings of the present invention. Illustratively, an administrator may associate any given severity level with any particular event. The starting time field 815 identifies the starting time of the current statistical sample. The last processed field 820 identifies the time when the EMS last processed an event notification message, i.e., the time when the EMS last permitted an event notification to be sent without being suppressed. The last occurred field 825 identifies the last time the event occurred regardless of whether it was suppressed. The last suppressed field 830 identifies the last time this event was suppressed as chatter in accordance with the present invention. The number suppressed field 835 identifies the total number of messages suppressed as chatter in accordance with the present invention. The number occurred field 840 identifies the total number of occurrences of this event. The array of recent occurrences field 845 illustratively includes 60 entries, one for each minute of the previous hour. Each of these entries identifies the number of occurrences that occurred during the specified minute. Similarly, the array of last day occurrences 850 illustratively includes 24 entries, one for each hour of the previous day and the array of last week occurrences field 855 includes seven entries, one for each day of the previous week. The chatter field 860 illustratively contains a Boolean value that identifies whether the event identified by the event name field 805 has been classified as a chatter event in accordance with the present invention.

G. Chatter Suppression

The present invention is directed to a system and method for suppressing chattering messages in a storage system using histogram analysis. According to the invention, an EMS 620 first calculates a suppression level based upon a rate at which log files 652 within the storage system are growing. The EMS then determines a possible percentage of non-chattering events based on the suppression level and thereafter generates a histogram of non-chattering events to calculate median and standard deviation. Additionally, the EMS 620 calculates a cutoff point for non-chattering events utilizing the generated histogram and mean/standard deviation. Events occurring less frequently than the cutoff point are deemed to be non-chattering events; those that occur more frequently are deemed to be chatter.

When an event notification is received for a possible chattering event, a determination is made as to whether the event is truly a chattering event by comparing its frequency of occurrence with the cutoff point. If the event is a chattering event, then the EMS suppresses the event notification in accordance with a suppression rate. Illustratively, the suppression rate limits logging of chattering events to not more than one log entry per N minutes, where N is determined by the rate of growth of the log files. If the event is not a chattering event, then the EMS does not suppress the event and the appropriate event notification is sent.

Figure 9:
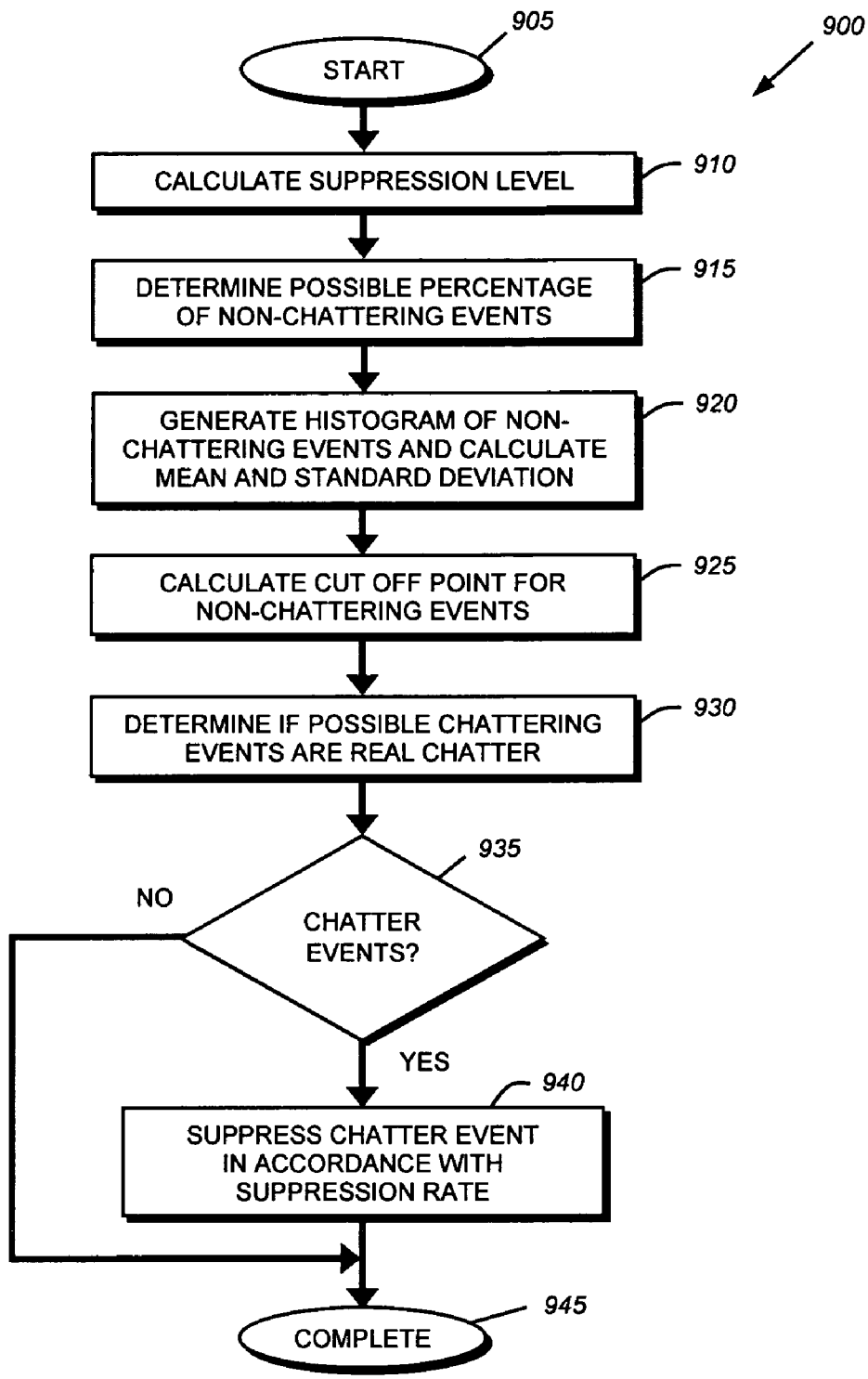
FIG. 9 is a flowchart detailing the steps of a procedure for suppressing chattering events in accordance with an embodiment of the present invention.

FIG. 9 is a flowchart detailing the steps of a procedure 900 for suppressing chattering events using histogram analysis in accordance with an embodiment of the present invention. The procedure 900 begins in step 905 and continues to step 910 where the EMS calculates a suppression level. Illustratively, there are three suppression levels: aggressive, normal and light. The suppression level is calculated by determining the rate at which the log file 652 is growing. If the log file is growing above an administrator defined target rate, the suppression level is set to aggressive. If the rate of growth is below the target rate but above 50% of the target rate then the suppression level is set to normal. Otherwise the suppression level is set to light. It should be noted that these suppression levels are illustrative only and that in alternate embodiments of the present invention differing numbers of levels of suppression may be utilized. Additionally, in alternate embodiments, the suppression level may be set based on metrics other than a rate of growth of log files 652. For example, the UI may provide the functionality for an administrator to set the suppression level at one of a plurality of levels.

In step 915, the EMS determines a possible percentage of non-chattering events. Illustratively, if the suppression level is light then at least 95% of the events are non-chattering. If the suppression level is normal, then at least 90% of the events are non-chattering and if the suppression level is aggressive, then only 80% of events are non-chattering. It should be noted that these percentages are illustrative only and that the present invention may be utilized with any acceptable percentage of non-chattering events. This percentage of non-chattering events identifies the percentage of the events occurring that are assumed to be non-chattering. In the example of a normal suppression level, at least 90% of the events are non-chattering which means that those events occurring in the 90th percentile or less are deemed to be non-chattering. Only those events occurring in the top 10% of the event occurrences may be chattering events. The EMS utilizes the various occurrence fields of the event statistics data structure 800 for tracking the number of occurrences of each event. In step 920, a histogram of non-chattering events is generated and the EMS calculates the mean and standard deviation. These statistics are calculated using the percentages calculated previously. The histogram is calculated using event occurrences previously collected and stored in the event statistics data structure 800.

The cutoff point for non-chattering events is calculated in step 925. Illustratively, the cutoff point is set to twice the 99% confidence interval. Thus, Cutoff Point=Mean+2(99% Confidence Interval)

Assuming a sufficient number of events, e.g. more than 30, this results in 99.999% of non-chattering events being below the cutoff point. Events occurring less frequently than the cutoff point are deemed to be non-chattering events. This determination is illustratively stored in the chatter field 860 of event statistics data structure 800.

In step 930 the EMS determines if possible chattering events are real chatter. Illustratively, this determination is made upon receipt of an event notification by EMS 620. Note that, the previous steps are illustratively performed on a routine basis to determine which events are chattering events or not. Step 930 illustratively occurs when an event notification has been received by the EMS. To determine if an event is chatter, the EMS checks the histogram count of the top N % of events against the cutoff point, wherein N equals 100% minus the appropriate percentage of events that are non-chattering (as determined in step 915 above). For example, if the suppression level is aggressive, then the percentage of events that may be non-chattering is 80%. As such, the EMS examines the histogram count of the top 20% (100%-80%) of events against the cutoff point. Those events that are beyond the cutoff point are marked as chatter. If it is determined in step 935 that the event is a chatter event, then the EMS suppresses that event in accordance with the suppression rate (step 940) before completing in step 945. The suppression rate is illustratively embodied as a time interval of M minutes, wherein the value of M is illustratively set to five minutes at the light level, 10 minutes at the normal level and 20 minutes at the aggressive level of suppression. Illustratively, the suppression rate causes only one event notification to be sent per M minutes regardless of the actual number of events occurring. Thus, for example, in response to a first message received at the aggressive level of suppression, a first event notification is logged. No further logging of this particular event will occur until M minutes have elapsed, regardless of the number of occurrences of the event. The EMS utilizes the last processed field 820, last occurred field 830 and last suppressed field 835 of event statistics data structure 800 in tracking when the appropriate suppression rate has been met. If, however, in step 935 it is determined that the event is not a chattering event, then the procedure completes in step 945.

Illustratively, the EMS recomputes the histogram and possible chattering events (steps 901-925) on a regular basis. This enables the EMS to dynamically modify which events are deemed to be chattering events based on actual occurrence values. In alternate embodiments, if the EMS detects that a significant number of events of a particular type, (not currently deemed a chattering event) occurs, the EMS may initialize procedure 900 to determine if the event receiving an abnormal number of occurrences has become a chattering event.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for suppression of notification of chattering events in a storage system comprising a processor and a memory, the method comprising:

setting a suppression level, of a plurality of suppression levels, by comparing a rate of growth of one or more event logs that log event notifications associated with a plurality of events to one or more predefined target rates;

calculating a set of statistics comprising a percentage of events of the plurality of events as non-chattering events based on the set suppression level;

calculating a cutoff point percentile for the non-chattering events based on the calculated set of statistics comprising the percentage of events of the plurality of events as the non-chattering events;

receiving an event notification associated with a particular event of the plurality of events;

determining if the particular event, associated with the received event notification, is a chattering event of the chattering events based on a comparison of a percentile of the is particular event to the cutoff point percentile, wherein the particular event is the chattering event if the particular event occurs in a percentile greater than the cutoff point percentile;

in response to determining that the particular event, associated with the received event notification, is the chattering event, suppressing the received event notification in accordance with a suppression rate; and dynamically modifying the determination as to whether the particular event, associated with the received event notification, is the chattering event based on actual occurrence values.

2. The method of claim 1 wherein the suppression rate is defined as limiting one event notification per a predetermined time period.

3. The method of claim 2 wherein the predefined time period is determined by the set suppression level.

4. The method of claim 1 wherein the cutoff point percentile is calculated based on twice a value of a 99% confidence interval.

5. A system for suppressing notification of chattering events, the system comprising:

an event management system executing on a computer, the event management system configured to suppress an event notification, associated with an event of a plurality of events, in accordance with a suppression rate in response to determining that the event associated with the event notification is a chattering event of the chattering events, wherein the event is the chattering event when the event occurs in a percentile greater than a cutoff percentile that is based upon a selected suppression level, of a plurality of suppression levels, that is set by comparing a rate of growth of one or more to event logs that log event notifications associated with the plurality of events to one or more predefined target rates.

6. The system of claim 5, wherein the suppression rate is defined as limiting one event notification per a predetermined time period.

7. The system of claim 5 wherein the event management system determines whether the event associated with the event notification is the chattering event by comparing a frequency of occurrence of the event with the cutoff percentile.

8. The system of claim 5 wherein the event management system suppressed the event notification in accordance with the suppression rate.

9. The system of claim 8 wherein the suppression rate is defined as limiting one event notification per a predetermined time period.

10. A system configured to suppress notification of chattering events in a storage system, the system comprising:

means for setting a suppression level, of a plurality of suppression levels, by comparing a rate of growth of one or more event logs that log event notifications associated with a plurality of events to one or more predefined target rates;

means for calculating a set of statistics comprising a percentage of events of the plurality of events as non-chattering events based on the set suppression level;

means for calculating a cutoff point percentile for the non-chattering events based on the calculated set of statistics comprising the percentage of events of the plurality of events as the non-chattering events;

means for receiving an event notification associated with a particular event of the plurality of events;

means for determining if the particular event, associated with the received event notification, is a chattering event of the chattering events based on a comparison of a percentile of the particular event to the cutoff point percentile, wherein the particular event is the chattering event if the particular event occurs in a percentile greater than the cutoff point percentile;

means for suppressing the received event notification in accordance with a suppression rate in response to determining that the particular event, associated with the received event notification, is a chattering event; and means for dynamically modifying the determination as to whether the particular event, associated with the received event notification, is the chattering event based on actual occurrence values.

11. The system of claim 10 wherein the suppression rate is defined as limiting one event notification per a predetermined time period.

12. The system of claim 11 wherein the predefined time period is determined by the set suppression level.

13. The system of claim 10 wherein the cutoff point percentile is calculated based on twice a value of a 99% confidence interval.

14. A non-transitory computer readable medium containing executable program instructions executed by a processor, comprising:

program instructions that set a suppression level, of a plurality of suppression levels, by comparing a rate of growth of one or more logs that log event notifications associated with a plurality of events to one or more predefined target rates;

program instructions that calculate a set of statistics comprising a percentage of events of the plurality of events as non-chattering events based on the set suppression level;

program instructions that calculate a cutoff point percentile for the non-chattering events based on the calculated set of statistics comprising the percentage of events of the plurality of events as the non-chattering events;

program instructions that receive an event notification associated with a particular event of the plurality of events;

program instructions that determine if the particular event, associated with the is received event notification, is a chattering event of the chattering event based on a comparison of a percentile of the particular event to the cutoff point percentile, wherein the particular event is the chattering event if the particular event occurs in a percentile greater than the cutoff point percentile;

program instructions that suppress the received event notification in response to determining that the particular event, associated with the received event notification, is the chattering event; and program instructions that dynamically modify the determination as to whether the particular event, associated with the received event notification, is the chattering event based on actual occurrence values.

15. A method for suppression of notification of chattering events, the method comprising:

calculating a cutoff point percentile for chattering events, the cutoff point percentile calculated using a set of frequency occurrences of events as non-chattering;

examining an event associated with a received event notification to determine if the event occurs at a percentile that exceeds the calculated cutoff point percentile that is based upon a selected suppression level, of a plurality of suppression levels, that is set by comparing a rate of growth of one or more event logs that log event notifications associated with a plurality of events to one or more predefined target rates; and storing, for the event, a set of data in an event statistics data structure, wherein the event statistics data structure comprises a plurality of counter fields identifying a number of occurrences of the event within a given time period and an indication of whether the event has previously been determined to be a chattering event.

16. The method of claim 15 further comprising in response to determining that the event occurs at a percentile that exceeds the calculated cutoff point percentile, suppressing the event notification.

17. The method of claim 16 wherein the suppression occurs in accordance with a suppression rate.

* * * * *

UNITED STATES PATENT AND TRADEMARK OFFICE
CERTIFICATE OF CORRECTION

| | |
|---|---|
| PATENT NO. | : 8,032,896 B1 |
| APPLICATION NO. | : 11/264472 |
| DATED | : October 4, 2011 |
| INVENTOR(S) | : Dongfeng Li |

It is certified that error appears in the above-identified patent and that said Letters Patent is hereby corrected as shown below:

Col. 4, line 66 should read: "processing elements, functionally organizes the node 200"

Col. 5, line 42 should read: "tions, such as a RAID-4 level implementation, enhance the"

Col. 7, line 35 should read: "the inode file using the inode number to access an appro-"

Col. 10, line 45 should read: "identifies a volume used in a volume location process. The"

Col. 11, line 13 should read: "recent occurrences field 845, an array of last day occurrences"

Col. 14, line 15 should read: "of the particular event to the cutoff point percentile,"

Col. 14, line 47 should read: "by comparing a rate of growth of one or more event"

Col. 16, line 9 should read: "associated with the received event notification, is a"

Signed and Sealed this
Sixth Day of March, 2012

David J. Kappos
*Director of the United States Patent and Trademark Office*